(12) United States Patent
Shitama et al.

(10) Patent No.: US 8,740,479 B2
(45) Date of Patent: Jun. 3, 2014

(54) OPTICAL CONNECTOR AND METHOD FOR ASSEMBLING SAME

(75) Inventors: Seiji Shitama, Chigasaki (JP); Yoshikyo Tamekuni, Chigasaki (JP); Yukihiro Yokomachi, Yokohama (JP); Yoshio Ukita, Komaki (JP); Motoyoshi Kimura, Komaki (JP)

(73) Assignees: SEI Optifrontier Co., Ltd., Yokohama (JP); Sumitomo Electric Industries, Ltd., Osaka (JP)

( * ) Notice: Subject to any disclaimer, the term of this patent is extended or adjusted under 35 U.S.C. 154(b) by 11 days.

(21) Appl. No.: 13/811,629

(22) PCT Filed: Jan. 10, 2012

(86) PCT No.: PCT/JP2012/050229
§ 371 (c)(1),
(2), (4) Date: Jan. 22, 2013

(87) PCT Pub. No.: WO2012/096246
PCT Pub. Date: Jul. 19, 2012

(65) Prior Publication Data
US 2013/0121653 A1    May 16, 2013

(30) Foreign Application Priority Data
Jan. 14, 2011 (JP) ................ 2011-005999

(51) Int. Cl.
*G02B 6/255* (2006.01)

(52) U.S. Cl.
USPC .......... 385/96; 385/95; 385/97; 385/98; 385/99

(58) Field of Classification Search
USPC ............... 385/95, 96, 97, 98, 99
See application file for complete search history.

(56) References Cited

U.S. PATENT DOCUMENTS 6,621,975 B2 * 9/2003 Laporte et al. ............ 385/135
7,597,483 B2 * 10/2009 Simmons et al. .......... 385/56

FOREIGN PATENT DOCUMENTS

| JP | 64032208 A | 2/1989 |
| JP | 09297243 A | 11/1997 |
| JP | 2005189609 A | 7/2005 |
| JP | 2009205100 A | 9/2009 |
| JP | 2010224195 A | 10/2010 |

* cited by examiner

*Primary Examiner* — Jennifer Doan
(74) *Attorney, Agent, or Firm* — Global IP Counselors, LLP

(57) ABSTRACT

An optical connector to which an optical fiber cord including an optical fiber ribbon and a sheath is to be attached includes: a ferrule member a fusion splice protection sleeve, housing and a fixing member. The ferrule member holds a plurality of embedded fibers which are to be fusion-spliced respectively to a plurality of optical fibers constituting the optical fiber ribbon. The fusion splice protection sleeve protects a fusion-spliced portion. The housing houses the ferrule member and the fusion splice protection sleeve. The housing has, at the rear end, a recess for receiving a bifurcated portion of the sheath. The fixing member fixes the sheath to the housings and by holding it.

6 Claims, 9 Drawing Sheets

OPTICAL CONNECTOR AND METHOD FOR ASSEMBLING SAME

CROSS-REFERENCE TO RELATED APPLICATIONS

This U.S. National stage application claims priority under 35 U.S.C. §119(a) to Japanese Patent Application No. 2011-005999, filed in Japan on Jan. 14, 2011, the entire contents of which are hereby incorporated herein by reference.

BACKGROUND OF THE INVENTION

1. Field of the Invention

The present invention relates to an optical connector to which an optical fiber cord including an optical fiber ribbon is to be attached, and also to a method of attaching an optical fiber cord to the optical connector.

2. Description of the Background Art

Japanese Patent Application Publication No. 2010-224195 describes an optical connector to which an optical fiber cord is attached such that a splice reinforcement part and a ferrule are provided in a housing of the optical connector altogether, wherein the splice reinforcement part is a part reinforced with a reinforcing sleeve at a fusion spliced portion of embedded optical fibers, which are inserted in and fixed to the ferrule, and a plurality of optical fibers included in the optical fiber cord and exposed at an end portion of the optical fiber cord.

With the above-mentioned conventional technique, when the optical fiber cord is pulled with a force, the optical fiber cord might be detached from the optical connector because the sheath of the optical fiber cord is not fixed to the optical connector. If any structure for fixing the sheath of the optical fiber cord is provided, it would increase the size of the optical connector, and consequently high-density arrangement of a plurality of such optical connectors having an optical fiber cord would become difficult.

In the case of the above-mentioned conventional technique, a rod-shaped reinforcement is embedded in the reinforcement sleeve. Providing one rod-shaped reinforcement only might cause warping of the reinforcement sleeve when the reinforcement sleeve is subjected to heat shrink. However, providing a plurality of rod-shaped reinforcements in the reinforcement sleeve would increase the size of a reinforcement sleeve.

In a male-type optical connector, which has guide pins, of the above-mentioned conventional technique, a pin clamp for preventing a guide pin from slipping out is formed in the rear part of a ferrule body such that a guide pin of the pin clamp is penetrated through a guide pin hole of the ferrule body. On the other hand, the pin clamp is unnecessary with respect to a female-type optical connector which has no guide pins. However, there are cases where a spacer equivalent to a pin clamp is provided so that coordination with the operation characteristics of a male-type optical connector may be obtained. Since such a spacer is a minute part, it is difficult to perform positioning of the ferrule body and the spacer, which would result in degradation of workability in the assembling of the optical connector.

SUMMARY OF THE INVENTION

The object of the present invention is to provide an optical connector which allows fixing the sheath of an optical fiber cord without increasing the connector size, and a method of attaching an optical fiber cord to the optical connector.

To this end, the invention provides an optical connector to which an optical fiber cord including an optical fiber ribbon and a sheath is to be attached, the optical fiber ribbon containing a plurality of optical fibers, and the sheath covering the optical fiber ribbon, and which comprises: (1) a ferrule member holding a plurality of embedded fibers which are to be fusion-spliced respectively to the plurality of optical fibers; (2) a fusion splice protection sleeve for protecting the fusion-spliced portion of the optical fibers and the embedded fibers; (3) a housing for accommodating the ferrule member and the fusion splice protection sleeve, the housing having, at the rear end, a recess for receiving a torn portion of the sheath; and (4) a fixing member for fixing the sheath to the housing by clamping, the fixing member being attached to the rear portion of the housing.

The splice protection sleeve may have a reinforcing metal plate extending in the longitudinal direction of the splice protection sleeve. The ferrule member may have a ferrule body and a spacer, the ferrule body having a pair of guiding holes into which a guide pin is inserted, and the spacer being arranged at the rear of the ferrule body and having one pair of projections respectively to be inserted into each guiding hole.

Another embodiment of the present invention is a method of attaching an optical fiber cord to an optical connector, the optical fiber cord having a sheath and an optical fiber ribbon containing a plurality of optical fibers. The method comprising steps of: (1) tearing the sheath at an end portion of an optical fiber cord so as to expose an optical fiber ribbon; (2) attaching a splice protection sleeve to the optical fiber cord; (3) fusion-splicing a plurality of optical fibers respectively with embedded fibers held in a ferrule member; (4) protecting the fusion spliced portion of the optical fibers and the embedded fibers by the splice protection sleeve; (5) putting the ferrule member and the splice protection sleeve in a housing; (6) putting the torn portion of the sheath onto a recess existing at a rear end part of the housing; and (7) fixing the sheath to the housing by attaching a fixing member to the rear portion of the housing so as to clamp the sheath.

According to the present invention, it is possible to fix, without enlarging the size of an optical connector, the sheath of an optical fiber cord to the optical connector. This enables high density arrangement of a plurality of optical connectors having an optical fiber cord.

DETAILED DESCRIPTION OF THE INVENTION

Figure 1:
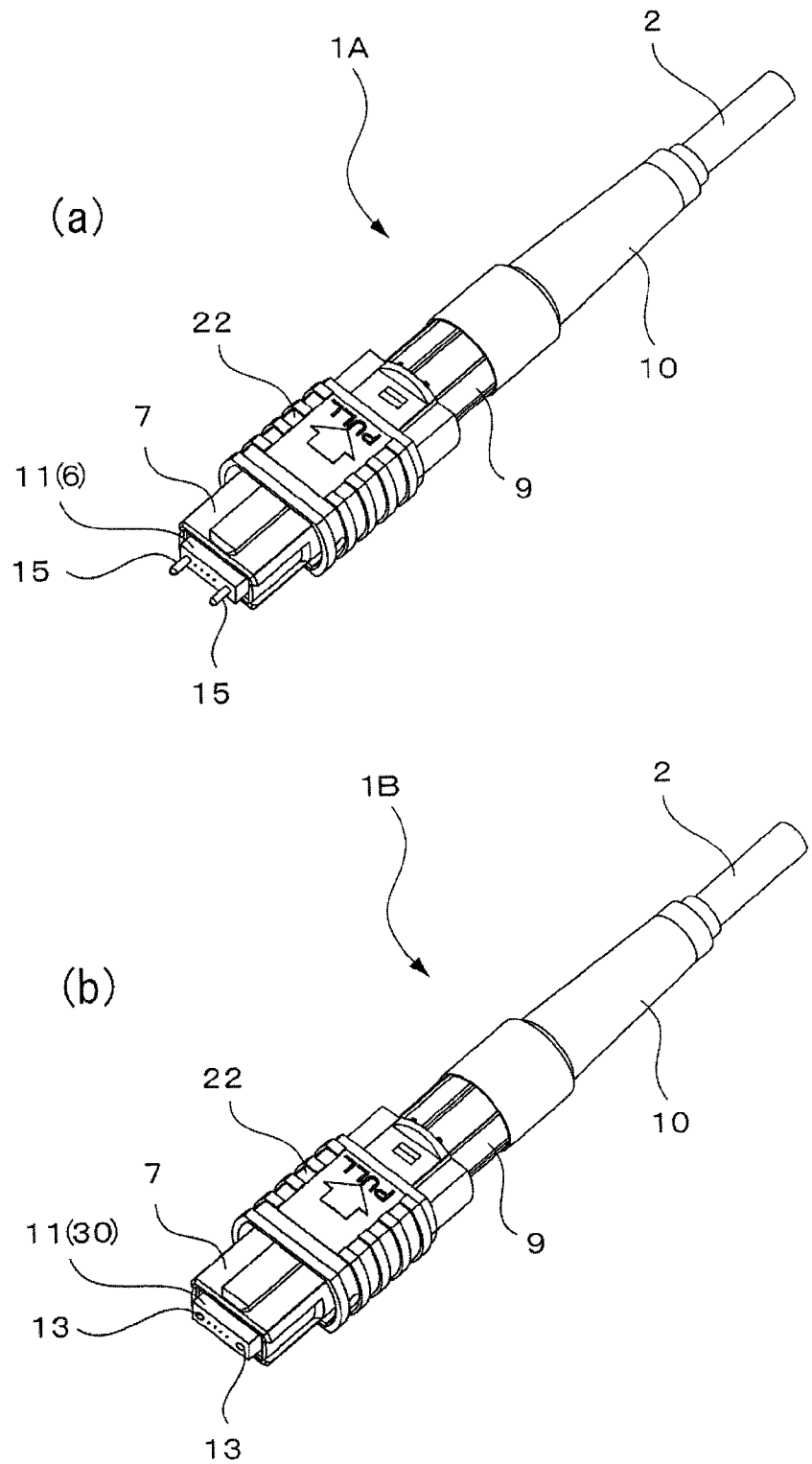
FIG. 1 Region (a) is a perspective view showing a state in which an optical fiber cord is attached to a male-type MPO connector, which is an embodiment of optical connector of the present invention, and Region (b) is a perspective view showing a state in which an optical fiber cord is attached to a female-type MPO connector, which is an embodiment of optical connector of the present invention.

Hereinafter, preferred embodiments of the present invention will be described in detail with reference to the accompanying drawings. In the drawings, an identical mark represents the same element and the repetition of explanation is omitted. The dimensional ratios in the drawings are not always exact.

Region (a) of FIG. 1 is a perspective view showing a state in which an optical fiber cord 2 is attached to a male-type MPO connector 1A which is an embodiment of the present invention (an optical connector having an optical cord), and Region (b) is a perspective view similarly showing a state in which an optical fiber cord 2 is attached to a female-type MPO connector 1B. The optical connectors 1A and the 1B are detachably coupled together through an optical adapter (not shown).

Figure 2:
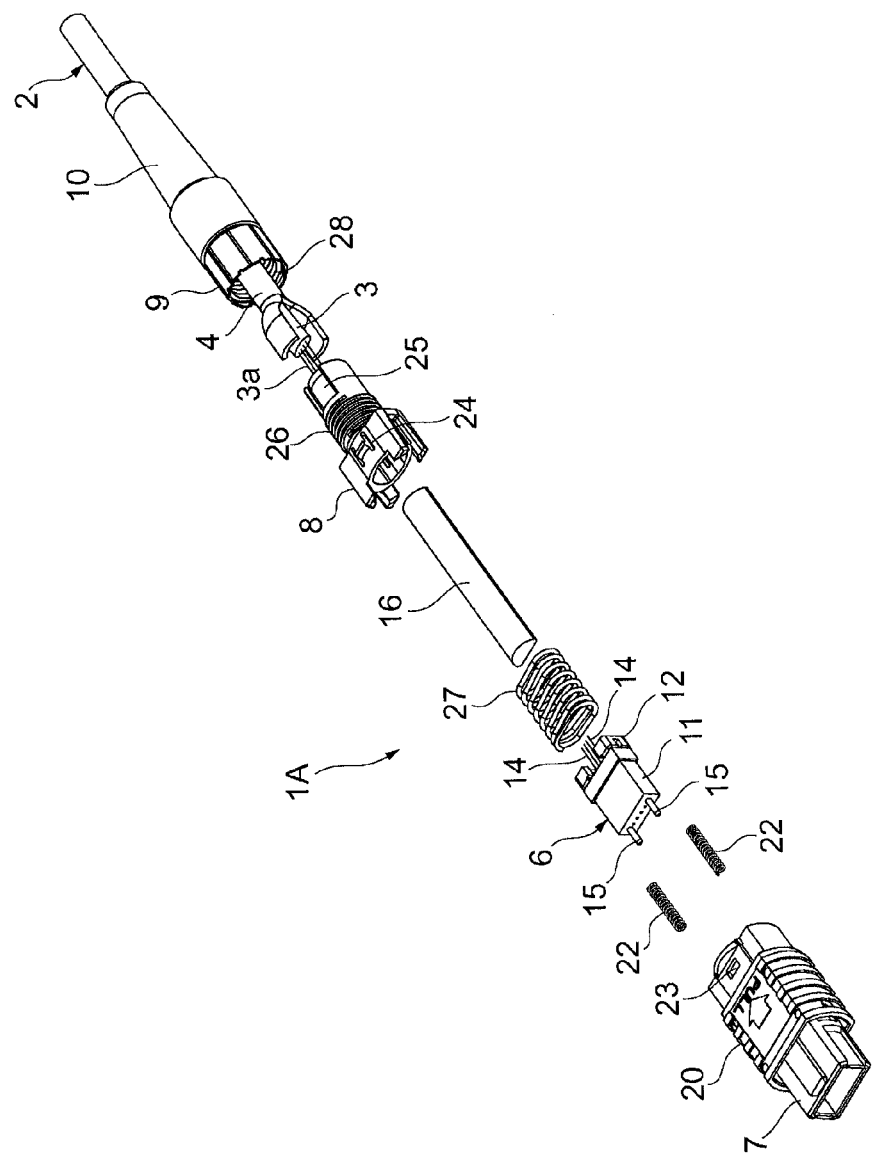
FIG. 2 is an exploded perspective view of the male-type MPO connector shown in Region (a) of FIG. 1.
Figure 3:
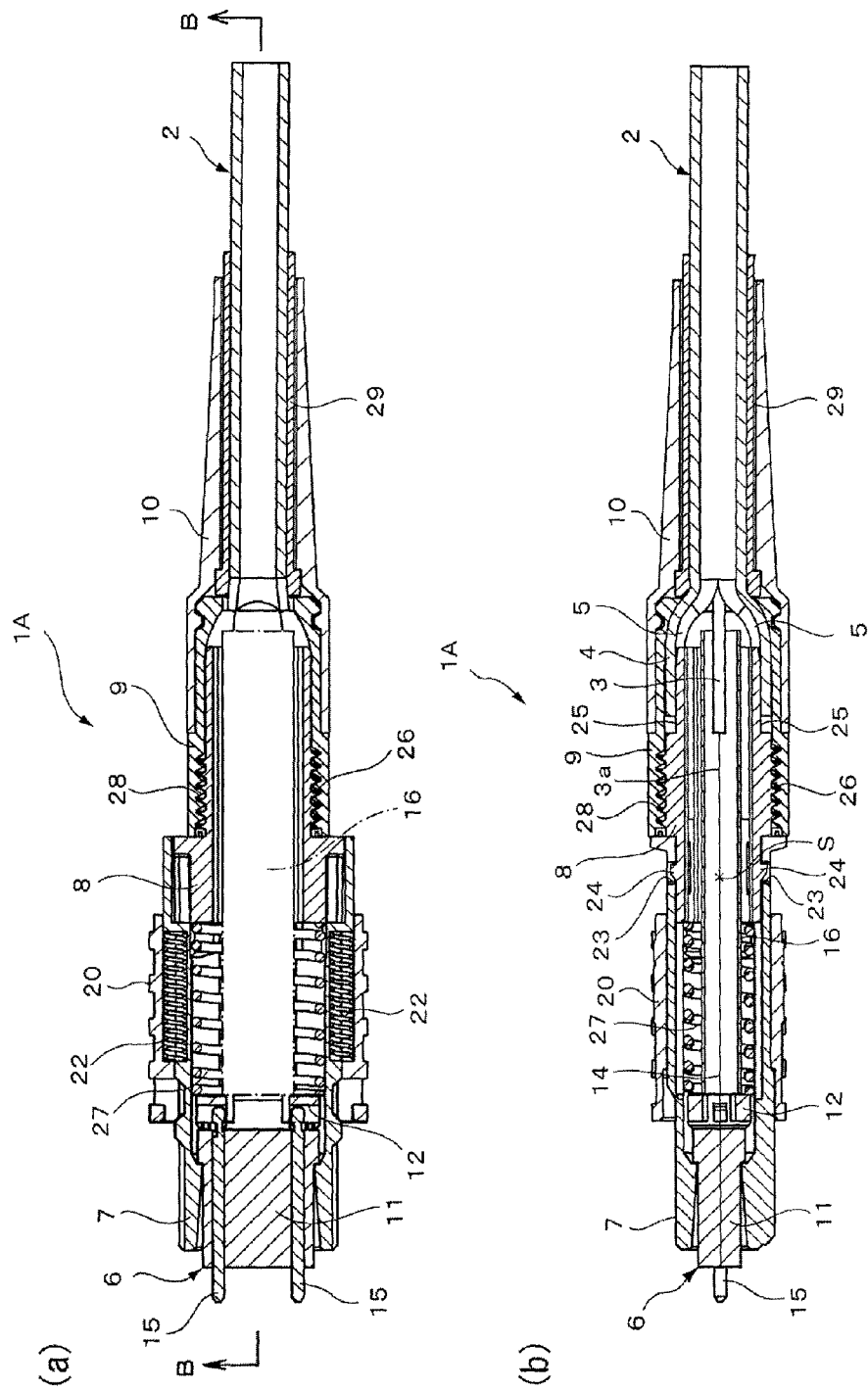
FIG. 3 Regions (a) and (b) are sectional views of the male-type MPO connector shown in Region (a) of FIG. 1; Region (b) is a sectional view taken along line B-B of Region (a) of FIG. 3.

FIG. 2 is an exploded perspective view of a male-type MPO connector 1A. In FIG. 3, Regions (a) and (b) show sectional views of the male-type MPO connector 1A, whereas Region (b) is a sectional view taken along line B-B of Region (a). The optical fiber cord 2 attached to the optical connector 1A comprises: an optical fiber ribbon 3 formed by arranging a plurality of optical fibers 3a; a sheath 4 covering the optical fiber ribbon 3; and a plurality of tensile fibers (aramid fibers) 5 which are interposed between the optical fiber ribbon 3 and the sheath 4. The optical connector 1A includes a ferrule member 6, a front housing 7, a rear housing 8, a fixing member 9, and a boot 10.

The ferrule member 6 consists of an MT-type ferrule body 11 and a pin keeper 12 arranged at the rear of the ferrule body 11. The ferrule body 11 has one pair of guiding holes and a plurality of fiber holes arranged between each pair of the guiding holes. Each fiber hole respectively contains each of short-length embedded fibers 14 which are to be fusion-spliced with each optical fiber 3a of the optical fiber ribbon 3. The pin keeper 12 holds one pair of guide pins 15 which respectively penetrate each guiding hole.

The front housing 7 is a component for accommodating the ferrule member 6 and a part of a splice protection sleeve 16. A coupling 20 for pulling out the optical connector 1A from an optical adapter (not shown) is attached to the front housing 7 in a manner in which it can move in a back and forth direction of the front housing 7. The front housing 7 is connected with the rear housing 8. The rear housing 8 collaborates with the front housing 7 in accommodating a splice protection sleeve 16. The splice protection sleeve 16 reinforces the respective fusion spliced portion S of the optical fibers 3a of the optical fiber ribbon 3 and the embedded fibers 14 held in the ferrule body 6. A ferrule spring 27 is arranged between the ferrule member 6 and the rear housing 8 so as to push the ferrule member 6 toward the front side of the front housing 7.

Figure 4:
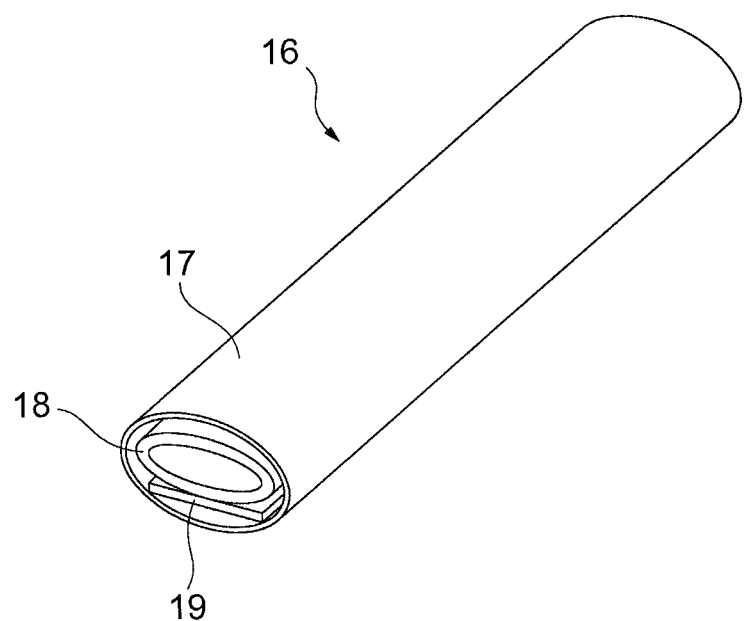
FIG. 4 is a perspective view of a splice protection sleeve included in an optical connector of the present invention.

FIG. 4 is a perspective view of a splice protection sleeve 16 included in the optical connectors 1A and 1B. The splice protection sleeve 16 has a heat shrinkable tube 17 having an ellipse-shaped cross-section and a thermoplastic tube 18 having an ellipse-shaped cross-section and arranged in the heat shrinkable tube 17. A reinforcement metal plate 19 extending in a longitudinal direction of the splice protection sleeve 16 is interposed between the heat shrinkable tube 17 and the thermoplastic tube 18. The metal plate 19 is a thin plate made of SUS 304 stainless steel, for example. The splice protection sleeve 16 is about 27 mm in length, for example, and the dimensions of the metal plate 19 are 0.2 to 0.3 mm in thickness, 3.7 mm in width, and 26 mm in length, for example.

Figure 5:
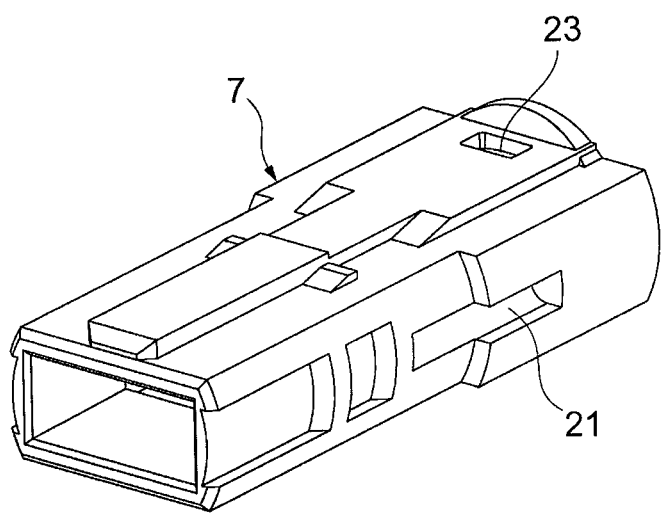
FIG. 5 is a perspective view of a front housing included in an optical connector of the present invention.

FIG. 5 is a perspective view of a front housing 7 included in the optical connectors 1A and 1B. Spring accommodation slots 21 are formed on both sides of the front housing 7. An ejector spring 22 for pushing a coupling 20 toward the front side of the front housing 7 is arranged in the spring accommodation slot 21. Two engaging windows 23 are formed at the rear part respectively on the top and bottom sides of the front housing 7.

Figure 6:
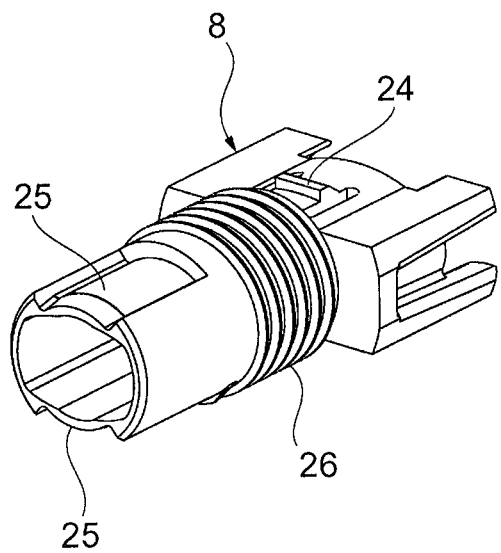
FIG. 6 is a perspective view of a rear housing included in the optical connector of the present invention.

FIG. 6 is a perspective view of a rear housing 8 included in the optical connectors 1A and 1B. Engaging protrusions 24 for respectively engaging with the engaging windows 23 of the front housing 7 are formed at the front part on the top and bottom surfaces of the rear housing 8. The cross-section of the rear end portion of the rear housing 8 is substantially ellipse-shaped. At a rear end part of the rear housing 8, a recess 25 for receiving the torn portion (refer to FIG. 2) of the sheath 4 of the optical fiber cord 2 is formed on top and bottom surfaces, which correspond to the locations of the respective engaging protrusions 24. As for the recess 25, it is preferable that the rear housing 8 be machined so that the whole thickness corresponding to the portion of the recess 25 may be uniform. A male screw part 26 is formed, at a region between the engaging protrusion 24 and the recess 25, around the outer circumference of the rear housing 8.

A fixing member 9 is fixed by screwing to the rear housing 8. The fixing member 9 is a cylindrical member for fixing the sheath 4 and tensile fiber 5 of the optical fiber cord 2 to the rear housing 8 by clamping. A female screw part 28 is formed around the inner circumference of the front side portion of the fixing member 9 so as to engage with the male-screw part 26 of the rear housing 8.

A boot 10, which is provided at a rear portion of the fixing member 9, helps to protect the optical fiber cord 2 so that a severe bending will not be applied to the optical fiber cord 2. A reinforcement tube 29 is beforehand attached to the boot 10.

Figure 7:
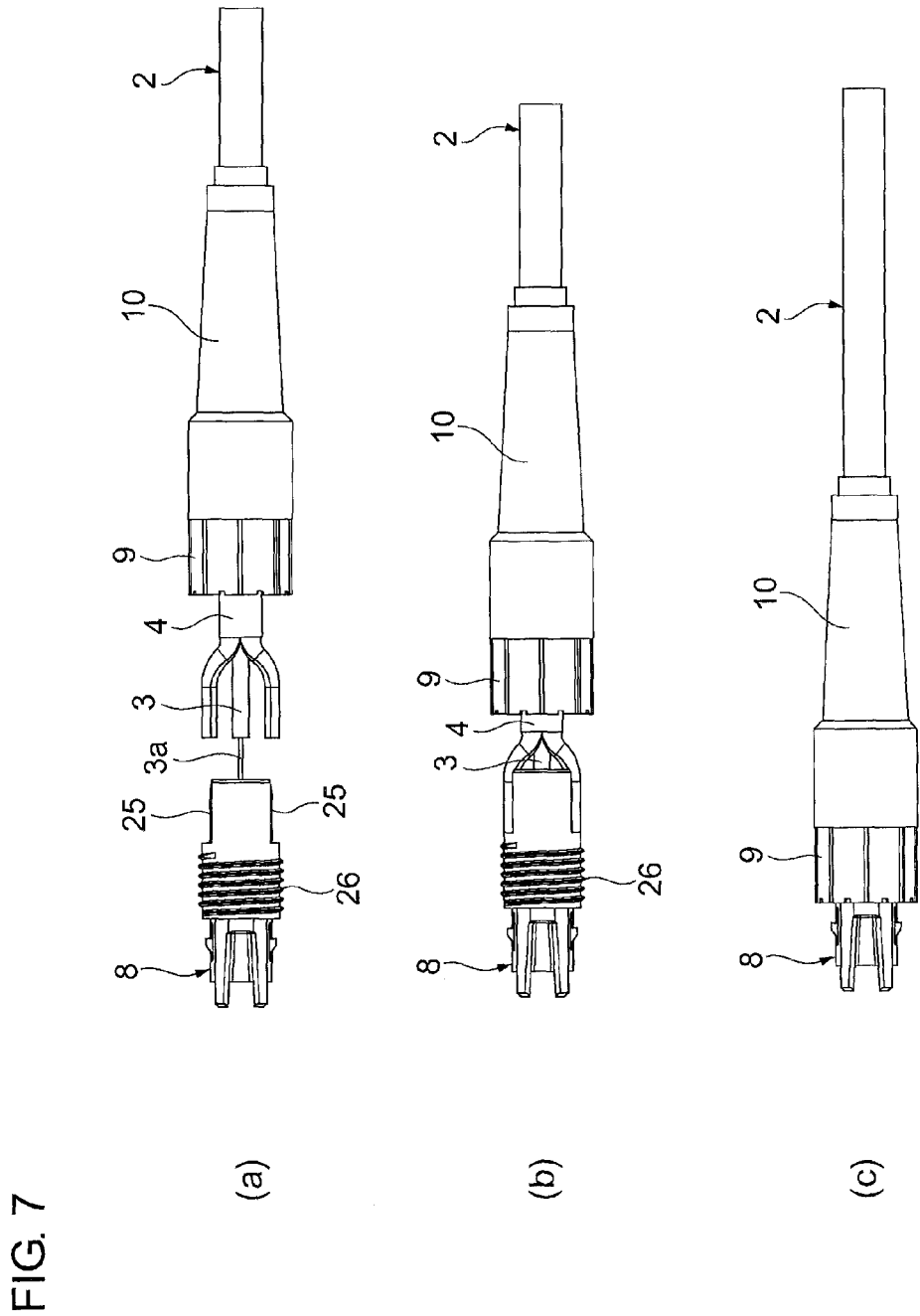
FIG. 7 Regions (a) to (c) are conceptual diagrams showing how the sheath of an optical fiber cord is fixed to a rear housing by the fixing member included in the optical connector of the present invention.

Regions (a) to (c) of FIG. 7 show a conceptual diagram illustrating how the sheath of an optical fiber cord is fixed to the rear housing 8 by the fixing member 9 included in the optical connectors 1A and 1B. For fixing the sheath 4 and the tensile fiber 5 (not shown) of the optical fiber cord 2 to the rear housing 8 by the fixing member 9, first, tear a tip portion of the sheath 4 of the optical fiber cord 2 so that it may be bifurcated (Region (a)). Then, put such a bifurcated portion of the sheath 4 on each recess 25 of the housing 8 (Region (b)). Subsequently, pull out the tensile fiber 5 of the optical fiber cord 2 from a gap of the bifurcated portion of the sheath 4 and put the tensile fiber 5 on the male-screw part 26 of the rear housing 8, and in such a state, thrust the fixing member 9 onto the rear housing 8 ((c) Region). Thus, the sheath 4 and the tensile fiber 5 are fixed in a state in which they are clamped between the rear housing 8 and the fixing member 9.

In the following, a method of attaching the optical fiber cord 2 to the optical connector 1 that is constituted as mentioned above will be described. First, remove the sheath 4 around the tip portion of the optical fiber cord 2 so that an optical fiber ribbon 3 and a tensile fiber 5 may be exposed. Thereafter, tear the tip portion of the sheath 4 so as to bifurcate it.

Attach the splice protection sleeve 16 to the optical fiber cord 2 beforehand by inserting the optical fiber cord 2 into the splice protection sleeve 16. Then, expose optical fibers 3a by removing the coating of the optical fiber ribbon 3, and cut the tip portion of the respective optical fibers 3a.

Subsequently, by using fusion splicing equipment (not shown), fusion-splice each optical fiber 3a of the optical fiber ribbon 3 and each embedded fiber 14 held by the ferrule member 6. In such case, it is desirable to fusion splice the embedded fibers 14 and the optical fibers 3a under the conditions in which a string-tied dust cap (not shown) is put on the ferrule body 11.

Subsequently, move the splice protection sleeve 16 so that the fusion spliced portion S of the embedded fibers 14 and the optical fibers 3a may be located at a longitudinally central part of the splice protection sleeve 16, and under such conditions, carry out heat-shrinking of the splice protection sleeve 16. In this case, the fusion spliced portion S will fully be protected by the splice protection sleeve 16, since the metal plate 19 is contained in the splice protection sleeve 16.

Put the ferrule member 6 into the front housing 7 in a state in which the optical fiber cord 2 is connected to the ferrule member 6. Subsequently, attach the rear housing 8 to the front housing 7 in a state in which the rear housing 8 and the fixing member 9 having a boot 10 cover the splice protection sleeve 16. Then, attach the fixing member 9 to the rear housing 8, and thereby cause the rear housing 8 and the fixing member 9 to fix the sheath 4 and the tensile fiber 5 of the optical fiber cord 2. According to the above-mentioned steps, the optical connector 1A having an optical fiber cord 2 is completed. Fixing the sheath 4 and the tensile fiber 5 of the optical fiber cord 2 by the rear housing 8 and the fixing member 9 enables preventing the sheath 4 (optical fiber cord 2) from rotating about the longitudinal axis relative to the ferrule member 6 even if the sheath 4 cannot necessarily be fixed firmly.

Figure 8:
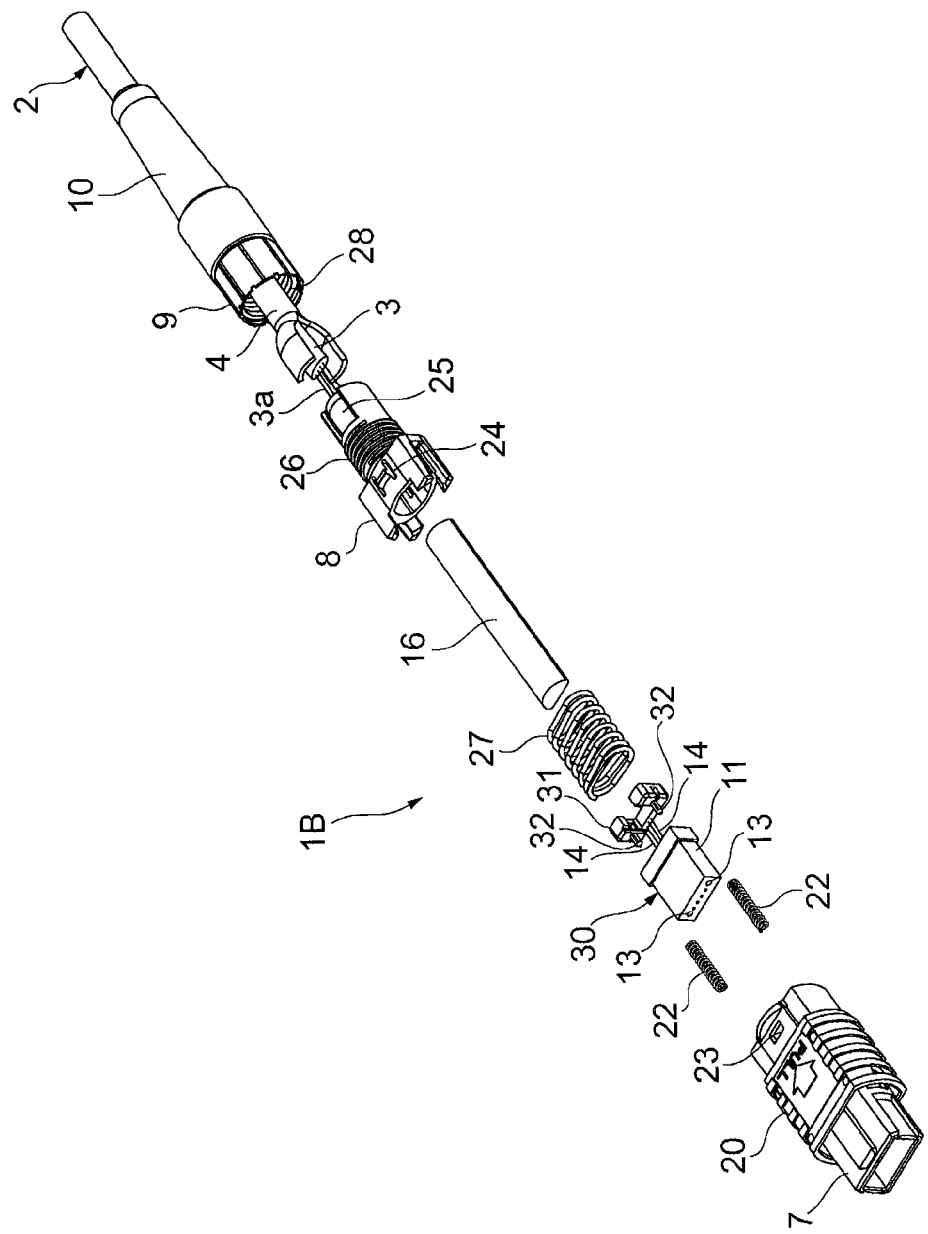
FIG. 8 is an exploded perspective view of the female-type MPO connector shown in Region (b) of FIG. 1.
Figure 9:
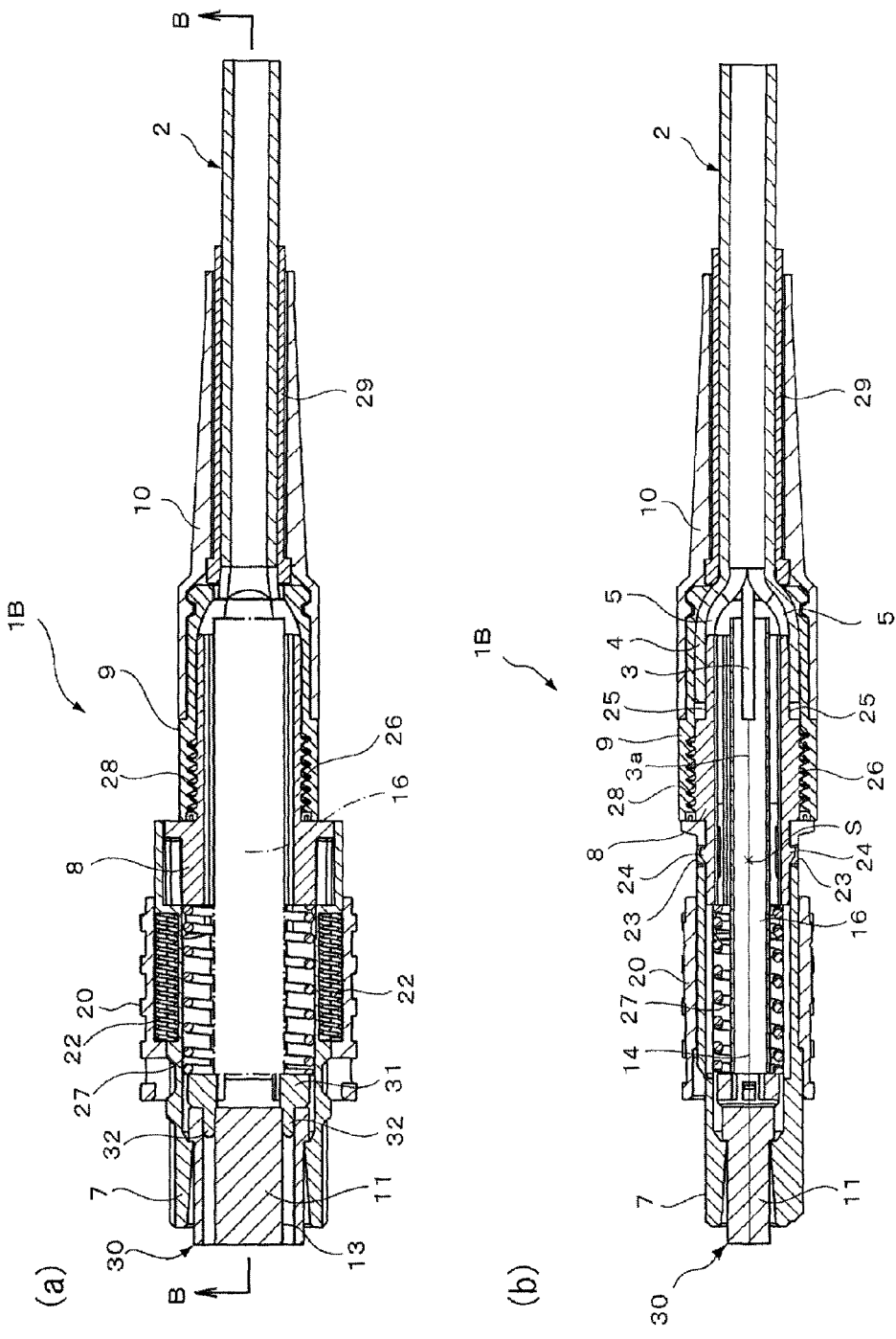
FIG. 9 Regions (a) and (b) are sectional views of the female-type MPO connector shown in Region (b) of FIG. 1; Region (b) is a sectional view taken along line B-B of Region (a) of FIG. 9.

FIG. 8 is an exploded perspective view of a female-type MPO connector 1B, and Regions (a) and Region (b) of FIG. 9 respectively show a sectional view of the female-type MPO optical connector 1B. Region (b) of FIG. 9 is a sectional view taken along line B-B in Region (a) of FIG. 9. The optical connector 1B comprises a ferrule member 30, a front housing 7, a rear housing 8, a fixing member 9, and a boot 10.

In the female-type optical connector 1B, no guide pins are provided, and hence it is unnecessary to provide such a pin keeper 12 as is provided in the ferrule body 6 of the male-type optical connector 1A. However, instead of the pin keeper 12, a spacer 31 is provided in the ferrule body 11 of the female-type optical connector 1B in order to make the pressing force of the ferrule spring 27 to be uniform with respect to the male-type optical connector 1A and the female-type optical connector 1B.

Figure 10:
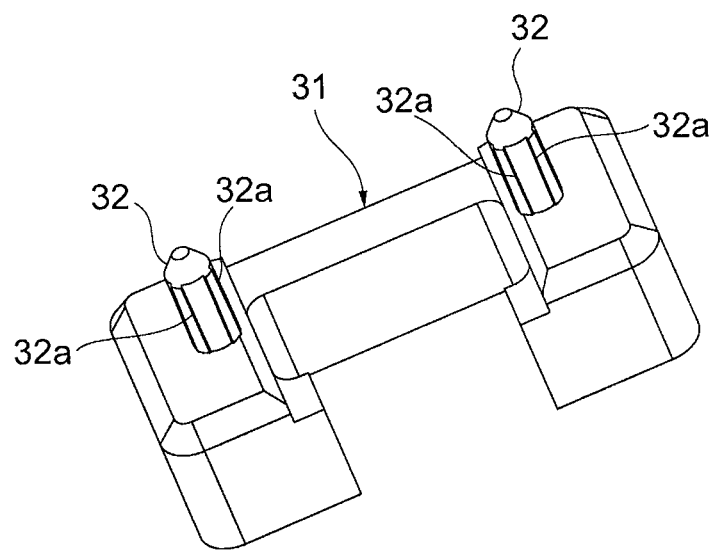
FIG. 10 is a perspective view showing a spacer included in a female-type MPO connector.

FIG. 10 is a perspective view showing the spacer 31. The spacer 31 has one pair of pin-like protrusions 32 to be inserted into the respective guiding holes 13 of the ferrule body 11. The pin-like protrusions 32 have a cross-section of substantially circular form in which four projecting parts 32a which slightly protrude outside are formed at equal intervals. The pin-like protrusions 32 are formed such that the root portion is thicker than the tip portion, exhibiting an inclination of about 0.5 degrees toward the tip from the root. Inserting the pin-like protrusions 32 into the guiding holes 13 of the ferrule body 11 makes it easy to position the spacer 31 relative to the ferrule body 11. As a result, it is possible to improve the performance of field assembling work for the optical connectors 1A and 1B. The structure of the spacer 31 can be applied to other types of multi-core connectors such as those using only a ribbon (tape) fiber.

The other structural composition of the optical connector 1B and the procedure for attaching an optical fiber cord 2 to the optical connector 1B are the same as in the case of the optical connector 1A described above.

As described above, with the optical connector according to the embodiment of the present invention, it is possible to fix the sheath 4 easily and surely in the field without increasing the outer dimensions of the fixing member 9, since two recesses 25 for receiving the bifurcated portions of the sheath 4 of the optical fiber cord 2 are formed in the rear end part of the rear housing 8 and the fixing member 9 is put into the rear housing 8 by screwing in a state in which the bifurcated portions of the sheath 4 are placed by positioning on the recesses 25. Consequently, in a case of arranging a plurality of optical connectors 1A and 1B having an optical fiber cord 2 side by side in a given space, for example, it is possible to arrange the optical connectors 1A and 1B with high density in a vertical direction.

The number of the recess 25 provided in the rear housing 8 in order to receive the sheath 4 is not necessarily two in particular, but it is desirable that the recess 25 be provided at least on a part having a smaller curvature (part corresponding to the top surface and the bottom surface of FIG. 6) at a rear end portion of the rear housing 8 (the cross-section of the rear end portion is substantially ellipse-shaped).

Since the metal plate 19 for reinforcement was provided in the splice protection sleeve 16, it is possible to fully restrain the splice protection sleeve 16 from bending when heat shrinking of the splice protection sleeve 16 is carried out, and after the heat shrinking of the splice protection sleeve 16 is carried out, the fusion spliced portion S is protected by the splice protection sleeve 16. Here, it might be considered to use, instead of the metal plate 19, a glass-based ceramic board as a reinforcing member of the splice protection sleeve; however, in order to secure the strength in such case, it would be inevitable to increase the thickness of the glass-based ceramic board, leading to increase in the size of the splice protection sleeve 16, and consequently leading to increase in the size of the housing. Using a metal plate as a reinforcing member enables securing the strength of the splice protection sleeve without increasing the size.

With the optical connector according to the embodiment of the present invention, by using a metal plate instead of a glass-based ceramic board for a metal plate 19, the strength can be secured even if the metal plate 19 is made somewhat thinner, and therefore the increase in the size of the splice protection sleeve 16 can be suppressed, and accordingly increase in the size of the optical connectors 1A and 1B can be suppressed as a whole. The splice protection sleeve 16 can be applied not only to a cord type but also to other types of multi-core connectors, such as those using a fiber ribbon (tape) only.

The present invention is not limited to the above-mentioned embodiments. For example, in the above-mentioned embodiment, the male-screw part 26 is formed around the outer circumference of the rear housing 8 and the female screw part 28 is formed in the inner circumference of the fixing member 9; however, the means for attaching the fixing member 9 to the rear housing 8 is not necessarily such a screw clamp. Also, the optical connectors 1A and 1B according to the above-mentioned embodiment are field-assembly type MPO connectors; however, the present invention can be applied to factory-assembly type MPO connectors and other multi-core or single-core connectors, etc.

CITATION LIST

Patent Literature

Patent Literature 1: Japanese Patent Application Publication No. 2010-224195.

What is claimed is:

1. An optical connector to which an optical fiber cord including an optical fiber ribbon and a sheath is attached, the optical fiber ribbon containing a plurality of optical fibers, and the sheath covering the optical fiber ribbon, comprising:
   a ferrule member holding a plurality of embedded fibers respectively to be fusion-spliced to the plurality of optical fibers;
   a fusion splice protection sleeve for protecting the fusion-spliced portion of the optical fibers and the embedded fibers;
   a housing for accommodating the ferrule member and the fusion splice protection sleeve, the housing having a male screw part around an outer circumference, and having, at a rear end, a recess for receiving a torn portion of the sheath; and
   a fixing member for fixing the sheath to the housing by clamping the sheath between the housing and the fixing member, the fixing member having a female screw part around an inner circumference so as to engage with the male screw part of the housing, and being attached to the rear portion of the housing.

2. An optical connector according to claim 1, wherein the splice protection sleeve has a reinforcing metal plate extending in the longitudinal direction of the splice protection sleeve.

3. An optical connector according to claim 1, wherein the ferrule member has a ferrule body and a spacer, the ferrule body having a pair of guiding holes for inserting a guide pin, the spacer being arranged at the rear side of the ferrule body and having one pair of projections respectively to be inserted into each guiding hole.

4. An optical connector according to claim 1, wherein the cross-section of the rear end portion of the housing is an ellipse expanding in a width direction of the optical fiber ribbon, and the recess is provided on a side having a smaller curvature of the ellipse.

5. A method of attaching an optical fiber cord to an optical connector, the optical fiber cord having a sheath and an optical fiber ribbon containing a plurality of optical fibers, the method comprising steps of:
   exposing the optical fiber ribbon at an end portion of the optical fiber cord by tearing the sheath;
   attaching a splice protection sleeve to the optical fiber cord;
   fusion-splicing the plurality of optical fibers respectively with embedded fibers held in a ferrule member;
   protecting the fusion spliced portion of the optical fibers and the embedded fibers by the splice protection sleeve;
   putting the ferrule member and the splice protection sleeve into a housing;
   putting a torn portion of the sheath onto a recess existing at a rear end part of the housing; and
   fixing the sheath to the housing by attaching a fixing member to the rear portion of the housing so as to clamp the sheath.

6. An optical connector according to claim 2, wherein the ferrule member has a ferrule body and a spacer, the ferrule body having a pair of guiding holes for inserting a guide pin, the spacer being arranged at the rear side of the ferrule body and having one pair of projections respectively to be inserted into each guiding hole.

* * * * *